United States Patent
Zhou et al.

(10) Patent No.: US 12,069,589 B2
(45) Date of Patent: Aug. 20, 2024

(54) UPLINK METRICS BASED ON CROSS-LINK INTERFERENCE

(71) Applicant: QUALCOMM Incorporated, San Diego, CA (US)

(72) Inventors: Yan Zhou, San Diego, CA (US); Qian Zhang, Basking Ridge, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 382 days.

(21) Appl. No.: 17/528,008

(22) Filed: Nov. 16, 2021

(65) Prior Publication Data
US 2023/0156619 A1 May 18, 2023

(51) Int. Cl.
*H04W 52/24* (2009.01)
*H04W 52/36* (2009.01)

(52) U.S. Cl.
CPC ....... *H04W 52/243* (2013.01); *H04W 52/242* (2013.01); *H04W 52/365* (2013.01); *H04W 52/367* (2013.01)

(58) Field of Classification Search
CPC ............. H04W 52/243; H04W 52/242; H04W 52/365; H04W 52/367; H04W 52/146; H04W 52/383
See application file for complete search history.

(56) References Cited

U.S. PATENT DOCUMENTS

| | | | |
|---|---|---|---|
| 2022/0248342 A1* | 8/2022 | Zhao | H04W 52/242 |
| 2023/0189163 A1* | 6/2023 | Ren | H04W 52/242 370/318 |

OTHER PUBLICATIONS

Intel Corporation, "UE-to-UE CLI measurement and reporting", Jan. 21-Jan. 25, 2019, 3GPP TSG RAN WG1 Ad-Hoc Meeting 1901, R1-1900489, pp. 1-5 (Year: 2019).*

* cited by examiner

Primary Examiner — Farid Seyedvosoghi
(74) Attorney, Agent, or Firm — Holland & Hart LLP/Qualcomm Incorporated

(57) ABSTRACT

Methods, systems, and devices for wireless communications are described. The method may include a base station establishing full-duplex communications with a first user equipment (UE) and a second UE. The method may include the first UE receiving an interference threshold from the base station, receiving a pathloss reference signal from the second UE, and determining cross-link interference between the first UE and the second UE based on the pathloss reference signal. The method may include the first UE adjusting a transmit power setting of the first UE in accordance with the cross-link interference and transmitting to the base station an uplink metric report, the uplink metric report including an uplink metric of the first UE that is based on the adjusted transmit power setting of the first UE.

24 Claims, 13 Drawing Sheets

UPLINK METRICS BASED ON CROSS-LINK INTERFERENCE

FIELD OF TECHNOLOGY

The following relates to wireless communications, including uplink metrics based on cross-link interference.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless systems may support uplink metric reporting in which a UE transmits channel information or other control information to a base station. In some cases, it may be desirable to improve the accuracy and reliability of uplink metric reporting.

SUMMARY

The described techniques relate to improved methods, systems, devices, and apparatuses that support uplink metrics based on cross-link interference. Generally, the described techniques provide for a base station establishing full-duplex communications with a first user equipment (UE) and a second UE. The first UE may receive a pathloss reference signal from the second UE and the first UE may determine cross-link interference between the first UE and the second UE based on the pathloss reference signal. In some cases, the first UE may transmit to the base station an uplink metric report, such as a power headroom report, an uplink reference signal received power (RSRP) report, or a power management maximum power reduction (P-MPR) report, that includes or otherwise takes into account the cross-link interference. In some cases, the UE may transmit two sets of uplink metrics, one set that takes into account the cross-link interference, and another set that does not consider the cross-link interference. These reporting techniques may allow the base station to mitigate cross-link interference by reducing uplink transmission power, increasing guard bands, or terminating full duplex operations, resulting in better throughput and overall channel efficiency.

A method for wireless communication is described. The method may include receiving at a first user equipment (UE) a pathloss reference signal from a second UE, determining cross-link interference between the first UE and the second UE based on the pathloss reference signal, adjusting a transmit power setting of the first UE in accordance with the cross-link interference, and transmitting to a base station an uplink metric report, the uplink metric report including an uplink metric of the first UE that is based on the adjusted transmit power setting of the first UE.

An apparatus for wireless communication is described. The apparatus may include a memory, a transceiver, and at least one processor of a first user equipment, the at least one processor coupled with the memory and the transceiver. The at least one processor may be configured to cause the apparatus to receive at the first UE a pathloss reference signal from a second UE, determine cross-link interference between the first UE and the second UE based on the pathloss reference signal, adjust a transmit power setting of the first UE in accordance with the cross-link interference, and transmit to a base station an uplink metric report, the uplink metric report including an uplink metric of the first UE that is based on the adjusted transmit power setting of the first UE.

Another apparatus for wireless communication is described. The apparatus may include means for receiving at a first UE a pathloss reference signal from a second UE, means for determining cross-link interference between the first UE and the second UE based on the pathloss reference signal, means for adjusting a transmit power setting of the first UE in accordance with the cross-link interference, and means for transmitting to a base station an uplink metric report, the uplink metric report including an uplink metric of the first UE that is based on the adjusted transmit power setting of the first UE.

A non-transitory computer-readable medium storing code for wireless communication is described. The code may include instructions executable by a processor to receive at a first UE a pathloss reference signal from a second UE, determine cross-link interference between the first UE and the second UE based on the pathloss reference signal, adjust a transmit power setting of the first UE in accordance with the cross-link interference, and transmit to a base station an uplink metric report, the uplink metric report including an uplink metric of the first UE that is based on the adjusted transmit power setting of the first UE.

Some examples of the method, apparatuses, and non-transitory computer-readable medium described herein may further include operations, features, means, or instructions for receiving an interference threshold from the base station and determining that the cross-link interference does not satisfy the interference threshold.

Some examples of the method, apparatuses, and non-transitory computer-readable medium described herein may further include operations, features, means, or instructions for adjusting the transmit power setting based on the determining that the cross-link interference does not satisfy the interference threshold.

In some examples of the method, apparatuses, and non-transitory computer-readable medium described herein, adjusting the transmit power setting may include operations, features, means, or instructions for reducing the transmit power setting of the first UE relative to a degree to which the cross-link interference exceeds the interference threshold.

Some examples of the method, apparatuses, and non-transitory computer-readable medium described herein may further include operations, features, means, or instructions for calculating the uplink metric, where an input of the calculating of the uplink metric includes the adjusted transmit power setting of the first UE.

In some examples of the method, apparatuses, and non-transitory computer-readable medium described herein, the uplink metric includes a first power headroom of the first UE, a first reference signal received power of the first UE, or a first power management maximum power reduction of the first UE, or any combination thereof.

Some examples of the method, apparatuses, and non-transitory computer-readable medium described herein may further include operations, features, means, or instructions for calculating a second uplink metric, where an input of the calculating of the second uplink metric includes a maximum transmit power of the first UE.

In some examples of the method, apparatuses, and non-transitory computer-readable medium described herein, the uplink metric report includes the uplink metric and the second uplink metric.

In some examples of the method, apparatuses, and non-transitory computer-readable medium described herein, the second uplink metric includes a second power headroom of the first UE, a second reference signal received power of the first UE, or a second power management maximum power reduction of the first UE, or any combination thereof.

In some examples of the method, apparatuses, and non-transitory computer-readable medium described herein, adjusting the transmit power setting may include operations, features, means, or instructions for reducing the transmit power setting of the first UE below a maximum uplink transmit power of the first UE.

In some examples of the method, apparatuses, and non-transitory computer-readable medium described herein, the first UE may be an aggressor UE and the second UE may be a victim UE.

In some examples of the method, apparatuses, and non-transitory computer-readable medium described herein, the cross-link interference corresponds to full duplex communications at the base station.

A method for wireless communication at a base station is described. The method may include establishing full-duplex communications with a first UE and a second UE, transmitting an interference threshold to the first UE, and receiving an uplink metric report from the first UE, the uplink metric report including an uplink metric of the first UE that is based on an adjusted transmit power setting of the first UE in relation to cross-link interference at the first UE failing to satisfy the interference threshold.

An apparatus for wireless communication is described. The apparatus may include a memory, a transceiver, and at least one processor of a base station, the at least one processor coupled with the memory and the transceiver. The at least one processor may be configured to cause the apparatus to establish full-duplex communications with a first UE and a second UE, transmit an interference threshold to the first UE, and receive an uplink metric report from the first UE, the uplink metric report including an uplink metric of the first UE that is based on an adjusted transmit power setting of the first UE in relation to cross-link interference at the first UE failing to satisfy the interference threshold.

Another apparatus for wireless communication at a base station is described. The apparatus may include means for establishing full-duplex communications with a first UE and a second UE, means for transmitting an interference threshold to the first UE, and means for receiving an uplink metric report from the first UE, the uplink metric report including an uplink metric of the first UE that is based on an adjusted transmit power setting of the first UE in relation to cross-link interference at the first UE failing to satisfy the interference threshold.

A non-transitory computer-readable medium storing code for wireless communication at a base station is described. The code may include instructions executable by a processor to establish full-duplex communications with a first UE and a second UE, transmit an interference threshold to the first UE, and receive an uplink metric report from the first UE, the uplink metric report including an uplink metric of the first UE that is based on an adjusted transmit power setting of the first UE in relation to cross-link interference at the first UE failing to satisfy the interference threshold.

Some examples of the method, apparatuses, and non-transitory computer-readable medium described herein may further include operations, features, means, or instructions for determining whether to continue operating in full duplex based on the uplink metric report.

In some examples of the method, apparatuses, and non-transitory computer-readable medium described herein, the uplink metric includes a first power headroom of the first UE, a first reference signal received power of the first UE, or a first power management maximum power reduction of the first UE, or any combination thereof.

In some examples of the method, apparatuses, and non-transitory computer-readable medium described herein, the uplink metric report includes the uplink metric and a second uplink metric that may be based on a maximum transmit power of the first UE independent of the cross-link interference at the first UE.

In some examples of the method, apparatuses, and non-transitory computer-readable medium described herein, the second uplink metric includes a second power headroom of the first UE, a second reference signal received power of the first UE, or a second power management maximum power reduction of the first UE, or any combination thereof.

DETAILED DESCRIPTION

Figure 1:
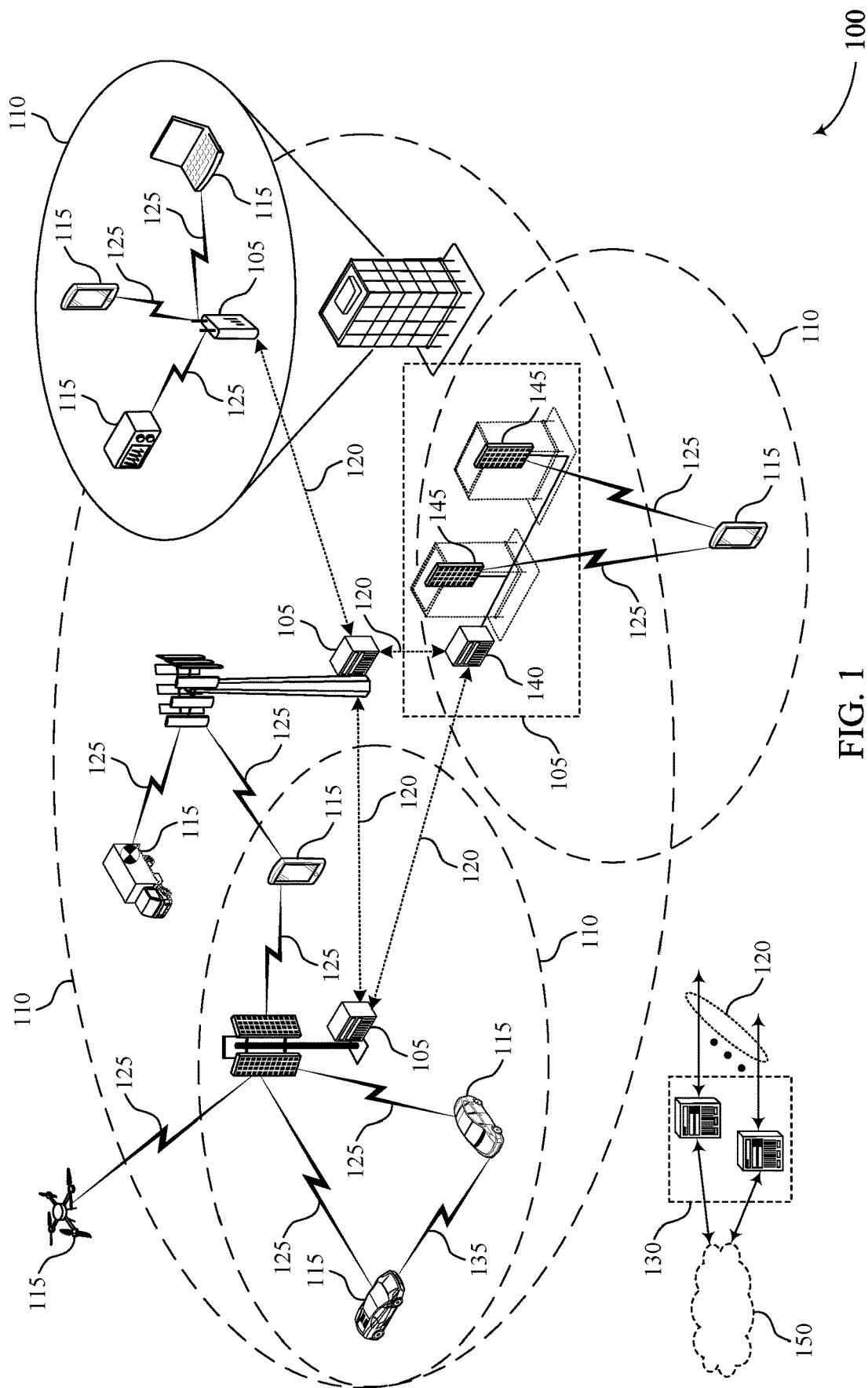
FIG. 1 illustrates an example of a wireless communications system that supports uplink metrics based on cross-link interference in accordance with aspects of the present disclosure.

The present techniques include uplink metric reporting based on cross-link interference between a first user equipment (UE) and a second UE. When a base station is operating in full duplex (FD) mode, an uplink UE (e.g., transmit UE) may cause cross-link interference (cross-link interference) to a downlink UE (e.g., receive UE), and as a result, the cross-link interference may affect the scheduling decisions of the base station. In some systems, a downlink UE may report to the base station when the downlink UE detects relatively high cross-link interference (e.g., an inter-UE channel becomes line of sight (LOS) due to mobility, etc.). Based on the high cross-link interference report, the base station may perform some mitigation procedures to decrease the cross-link interference, such as instructing the uplink UE to reduce uplink transmit power, increasing a guard band between the uplink and downlink communications, or terminating FD mode until the cross-link interference improves. However, the mitigation process may experience time delays due to a latency of the downlink UE transmitting the report as a result of the relatively high cross-link interference at the downlink UE. Thus, it may be quicker and more effective for the uplink UE to transmit an indication of the high cross-link interference (e.g., an uplink metric report) to the base station instead of the downlink UE. However, current uplink metric reports do not take cross-link interference into consideration.

The present techniques are based on uplink metric reports taking cross-link interference into consideration. In some cases, a UE may not transmit more than the maximum power allowed by its power class. The level of available transmission power in each UE is an input for the uplink scheduler of a base station. Scheduling a higher data rate than what is supported by the available TP is a waste of resources. In the downlink, the power level is known by the base station that manages the power amplifier and the downlink scheduler. Conversely, in the uplink, the available power is estimated by the UE and the UE may send the estimate (e.g., uplink metric report) to the base station, which may include one or more uplink metrics. The uplink metrics may include the power headroom (PHR) of the UE, the reference signal received power (RSRP) of the UE, or the power management maximum power reduction (P-MPR) of the UE, or any combination thereof.

The present techniques enable an uplink UE to mitigate cross-link interference to at least some level while the uplink UE is co-scheduled with a downlink UE (e.g., while a base station of the uplink UE and the downlink UE is operating in FD mode). Thus, the present techniques unload the base station in the cross-link interference mitigation process, resulting in a reduction to the latency of cross-link interference mitigation processes that depend on the base station to mitigate the cross-link interference.

In some cases, a downlink UE may transmit to the uplink UE an indication of crosslink signal degradation between the uplink UE and the downlink UE (e.g., via a pathloss reference signal). To mitigate the cross-link interference, the uplink UE may modify a transmit power setting of the uplink UE based on the indicated level of cross-link interference. The uplink UE may modify the transmit power setting based on a cross-link interference threshold to reduce the indicated cross-link interference to or below the cross-link interference threshold. The uplink UE may calculate an uplink metric based on the modified transmit power setting. The uplink UE may generate an uplink metric report that includes the cross-link interference-based uplink metric (e.g., PHR, RSRP, or P-MPR, or any combination thereof respectively calculated based on the modified transmit power setting). The uplink UE may then transmit the uplink metric report to the base station. The base station may adjust an uplink scheduler of the base station, adjust a scheduling of data rates, adjust an antenna configuration associated with uplink communications from the uplink UE, etc., based on the uplink metric report. Accordingly, the base station may continue operating in FD mode based on the uplink UE mitigating cross-link interference between the uplink UE and downlink UE to at least some level of cross-link interference.

Aspects of the subject matter described herein may be implemented to realize one or more advantages. The described techniques may support improvements in system efficiency such that latency associated with the uplink UE or downlink UE, or both, is reduced (e.g., receive downlink signals in uplink-only slots, resulting in latency savings). Additionally, described techniques may result in increasing spectrum efficiency (e.g., per cell, per UE), increasing resource utilization efficiency, increase the reliability of a decoding procedure for uplink transmissions at the base station, increase the reliability of a decoding procedure for downlink transmissions at the downlink UE, and improving user experience.

Aspects of the disclosure are initially described in the context of wireless communications systems. Aspects of the disclosure are further illustrated by and described with reference to additional examples of the wireless communications systems and process flows that relate to uplink metric reporting based on cross-link interference. Aspects of the disclosure are further illustrated by and described with reference to apparatus diagrams, system diagrams, and flowcharts that relate to uplink metric reporting based on cross-link interference.

FIG. 1 illustrates an example of a wireless communications system 100 that supports uplink metrics based on cross-link interference in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

In some examples, one or more components of the wireless communications system 100 may operate as or be referred to as a network node. As used herein, a network node may refer to any UE 115, base station 105, entity of a core network 130, apparatus, device, or computing system configured to perform any techniques described herein. For example, a network node may be a UE 115. As another example, a network node may be a base station 105. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105. In yet other aspects of this example, the first, second, and third network nodes may be different. Similarly, reference to a UE 115, a base station 105, an apparatus, a device, or a computing system may include disclosure of the UE 115, base station 105, apparatus, device, or computing system being a network node. For example, disclosure that a UE 115 is configured to receive information from a base station 105 also discloses that a first network node is configured to receive information from a second network node. In this example, consistent with this disclosure, the first network node may refer to a first UE 115, a first base station 105, a first apparatus, a first device, or a first computing system configured to receive the information; and the second network node may refer to a second UE 115, a second base station 105, a second apparatus, a second device, or a second computing system The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_S=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, a base station 105 may establish full-duplex communications with a first UE 115 and a second UE 115. The first UE 115 may receive a pathloss reference signal from the second UE 115. The first UE 115 may determine cross-link interference between the first UE 115 and the second UE 115 based on the pathloss reference signal from the second UE 115. In some cases, the first UE 115 may adjust a transmit power setting of the first UE 115 (e.g., set an interim maximum transmit power below an overall maximum transmit power of the first UE 115) based on the cross-link interference. In some cases, the first UE 115 may adjust the transmit power setting of the first UE 115 based on the cross-link interference at the first UE 115 failing to satisfy an interference threshold (e.g., received from the base station). In some cases, the first UE 115 may transmit to the base station an uplink metric report that includes an uplink metric computed by the first UE 115 where the computation uses the adjusted transmit power setting of the first UE 115 as an input.

Figure 2:
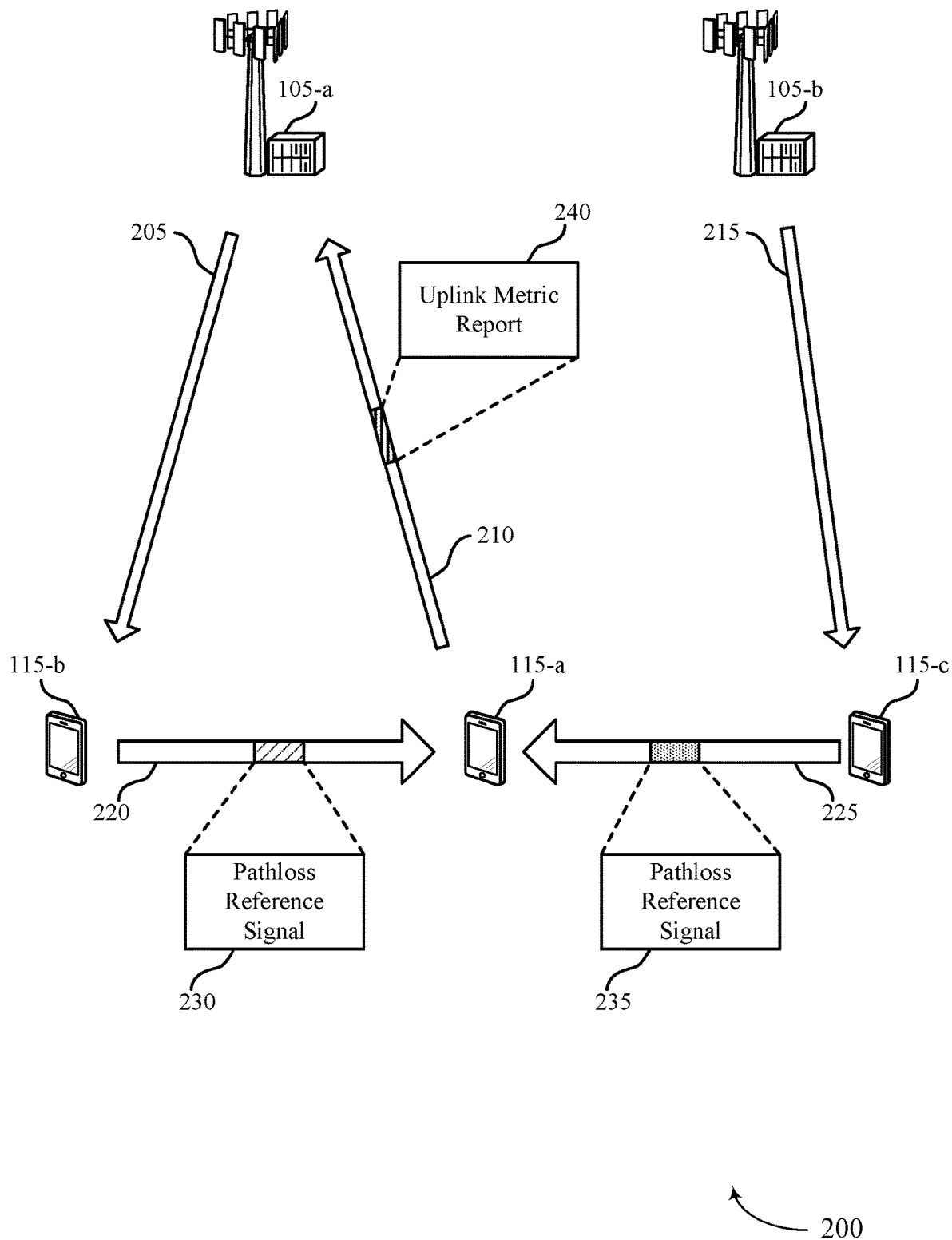
FIG. 2 illustrates an example of a wireless communications system that supports uplink metrics based on cross-link interference in accordance with aspects of the present disclosure.

FIG. 2 illustrates an example of a wireless communications system 200 that supports uplink metrics based on cross-link interference in accordance with aspects of the present disclosure. In some examples, some aspects of wireless communications system 200 may implement or be implemented by aspects of wireless communications system 100. For example, wireless communications system 200 may include a base station 105-*a*, UE 115-*a*, UE 115-*b*, and UE 115-*e*, which may be respective examples of a base station 105 and a UE 115 described with reference to FIG. 1.

As illustrated, wireless communications system 200 may include a direct link 205 between base station 105-*a* and UE 115-*a*, a direct link 210 between base station 105-*a* and UE 115-*b*, and a direct link 215 between base station 105-*b* and UE 115-*c*. Wireless communications system 200 may include a sidelink 220 between UE 115-*a* and UE 115-*b* and a sidelink 225 between UE 115-*a* and UE 115-*c*. In some examples, direct link 205, direct link 210, and direct link 215 may each include a downlink or an uplink, or both. In the illustrated example, direct link 205 may include a downlink, direct link 210 may include an uplink, and direct link 215 may include a downlink. In some examples, base station 105-*a* may use the downlink of direct link 205 to convey control and/or data information to UE 115-*a* and the uplink of direct link 210. In some cases, the downlink of direct link 205 may use different time and/or frequency resources than the uplink of direct link 205. In some cases, UE 115-*a* may use sidelink 220 to communicate control and/or data information to UE 115-*b*, while UE 115-*b* may use sidelink 220 to convey control or data information to UE 115-*a*. In some cases, UE 115-*c* may use sidelink 225 to convey control and/or data information to UE 115-*a*, while UE 115-*a* may use sidelink 225 to convey control or data information to UE 115-*c*.

In some examples, base station 105-*a* may establish full-duplex communications with UE 115-*a* and UE 115-*b*. In some cases, base station 105-*a* may establish full-duplex communications with UE 115-*a* and UE 115-*b* while base station 105-*b* communicates with UE 115-*c*. In the illustrated example, UE 115-*a* (e.g., an uplink UE, transmitting UE, aggressor UE) may transmit uplink transmissions to base station 105-*a* while UE 115-*b* (e.g., a downlink UE, receiving UE, victim UE) receives downlink transmissions from the base station 105-*a*. Additionally, or alternatively, UE 115-*a* may transmit uplink transmissions to base station 105-*a* while UE 115-*c* (e.g., second downlink UE, second receiving UE, second victim UE) receives downlink transmissions from the base station 105-*b*.

In some examples, UE 115-*b* may transmit to UE 115-*a* a pathloss reference signal 230. Additionally, or alternatively, UE 115-*c* may transmit to UE 115-*a* a pathloss reference signal 235. In some cases, base station 105-*a* may configure one or more aspects of a configuration of such pathloss reference signals and indicate the one or more aspects of the pathloss reference signal configuration to UE 115-*a*, UE 115-*b*, or UE 115-*c*, or any combination thereof.

In some examples, UE 115-*a* may determine cross-link interference between UE 115-*a* and UE 115-*b* based on the pathloss reference signal 230 from UE 115-*b*. Additionally, or alternatively, UE 115-*a* may determine cross-link interference between UE 115-*a* and UE 115-*c* based on the pathloss reference signal 235 from UE 115-*c*. UE 115-*a* may analyze (e.g., perform channel measurements on) the pathloss reference signal 230 received from UE 115-*b*, and determine, based on the analysis, that the pathloss reference signal from UE 115-*b* indicates some level of crosslink interference between the UE 115-*a* and the UE 115-*b*. Additionally, or alternatively, UE 115-*a* may analyze (e.g., perform channel measurements on) the pathloss reference signal 235 received from UE 115-c, and determine, based on the analysis, that the pathloss reference signal 235 from UE 115-c indicates some level of crosslink interference between the UE 115-a and the UE 115-c.

In some examples, the UE 115-a may be configured with an interference threshold. In some cases, the interference threshold may be based on a configuration of UE 115-a according to a specification of the interference threshold and before receiving the pathloss reference signal 230 or the pathloss reference signal 235. Additionally, or alternatively, the interference threshold may be communicated to the UE 115-a by the base station 105-a. In some cases, base station 105-a may transmit (e.g., broadcast) an interference threshold to UE 115-a, UE 115-b, or UE 115-c, or any combination thereof.

In some examples, UE 115-a may adjust a transmit power setting of UE 115-a in accordance with the cross-link interference. In some cases, UE 115-a may determine a transmit power setting that takes the cross-link interference between UE 115-a and UE 115-b into consideration. In some cases, UE 115-a may adjust (e.g., reduce) the transmit power setting of the UE 115-a relative to a degree to which the cross-link interference exceeds the interference threshold. UE 115-a may be configured with a maximum transmit power (e.g., an overall maximum transmit power of 23 dBm). In some cases, analysis of the pathloss reference signal 230 by UE 115-a may indicate the interference between the UE 115-a and the UE 115-b is −12 dBm, while the interference threshold is configured at −15 dBm (e.g., the interference between the UE 115-a and the UE 115-b is 3 dBm above the interference threshold). To keep the interference between the UE 115-a and the UE 115-b at or below the interference threshold of −15 dBm, the UE 115-a may adjust the transmit power of UE 115-a (e.g., set an interim maximum transmit power to 20 dBm, or set the interim maximum transmit power to be 3 dBm lower than the maximum transmit power of 23 dBm), which in turn may lower the interference between the UE 115-a and the UE 115-b (e.g., resulting in the interference dropping from −12 dBm to −15 dBm, at or below the interference threshold of −15 dBm).

In some examples, UE 115-a may compute an uplink metric based on the adjusted transmit power setting (e.g., based on a value of the interim maximum transmit power). In some cases, UE 115-a may use the adjusted transmit power setting as an input in the computation of the uplink metric. The uplink metric computed by UE 115-a may include a power head-room (PHR) of UE 115-a, a reference signal received power (RSRP) of UE 115-a, or a power management maximum power reduction (P-MPR) of UE 115-a, or any combination thereof.

In some examples, UE 115-a may transmit an uplink metric report 240 to base station 105-a. The uplink metric report 240 may include the uplink metric (e.g., one or more uplink metrics) that UE 115-a computed based on the adjusted transmit power setting of the UE 115-a (e.g., in relation to cross-link interference at the UE 115-a failing to satisfy the interference threshold).

In some examples, UE 115-a may calculate a second uplink metric, where an input in the calculating of the second uplink metric includes a maximum transmit power of the UE 115-a (e.g., an overall maximum transmit power of the UE 115-a). In some cases, the second uplink metric comprises a second power headroom of the UE 115-a, a second reference signal received power of the UE 115-a, or a second power management maximum power reduction of the UE 115-a, or any combination thereof. Thus, UE 115-a may calculate a first uplink metric based on the adjusted transmit power setting of UE 115-a (e.g., an interim maximum transmit power of 20 dBm) and calculate a second uplink metric based on the unadjusted transmit power setting of UE 115-a (e.g., an overall maximum transmit power of 23 dBm). In some cases, the uplink metric report 240 may include the first uplink metric and the second uplink metric.

In some example, base station 105-a may receive the uplink metric report 240, analyze one or more aspects of the uplink metric report 240, and perform one or more operations based on the analysis. In some cases, base station 105-a may determine whether to continue operating in full duplex based on the analysis of the uplink metric report 240.

The present techniques may improve system efficiency such that latency associated with the UE 115-a, UE 115-b, or UE 115-c, or any combination thereof, is reduced. Additionally, described techniques may result in increasing spectrum efficiency (e.g., per cell, per UE), increasing resource utilization efficiency, increase the reliability of a decoding procedure for uplink transmissions at base station 105-a, increase the reliability of a decoding procedure for downlink transmissions at the UE 115-b, and improving user experience at UE 115-a, UE 115-b, or UE 115-c, or any combination thereof.

Figure 3:
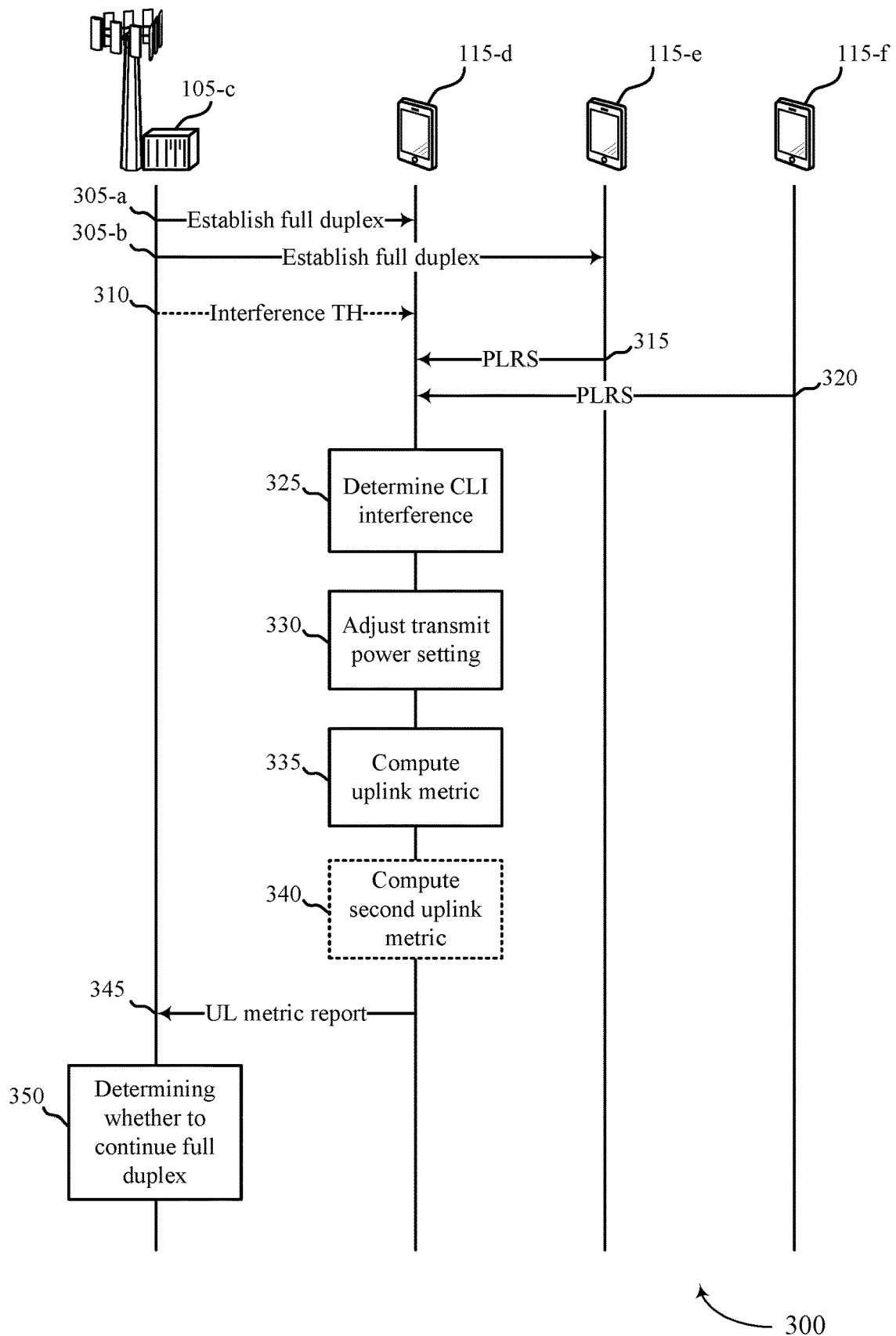
FIG. 3 illustrates an example of a process flow that supports uplink metrics based on cross-link interference in accordance with aspects of the present disclosure.

FIG. 3 illustrates an example of a process flow 300 that supports uplink metrics based on cross-link interference in accordance with aspects of the present disclosure. In some examples, some aspects of process flow 300 may implement or be implemented by aspects of wireless communications system 100. For example, process flow 300 may include a base station 105-c, first UE 115-d, second UE 115-e, and third UE 115-f, which may be respective examples of a base station 105 or UE 115 described with reference to FIG. 1. In some cases, first UE 115-d and second UE 115-e may be communicatively associated with base station 105-c, while third UE 115-f may be communicatively associated with a base station other than base station 105-c.

At 305-a, base station 105-c may establish full-duplex communications with first UE 115-d. At 305-b, base station 105-c may establish full-duplex communications with second UE 115-e. In some cases, third UE 115-f may establish communications with a base station other than base station 105-c.

At 310, base station 105-c may optionally transmit an interference threshold to first UE 115-d (e.g., after base station 105-c establishes full-duplex communications with first UE 115-d and second UE 115-e). In some cases, first UE 115-d may be configured (e.g., before base station 105-c establishes full-duplex communications with first UE 115-d and second UE 115-e) with the interference threshold. In some cases, first UE 115-d may set the interference threshold based on its configuration, based on channel conditions, or based on its location, or any combination thereof.

At 315, first UE 115-d may receive a pathloss reference signal from second UE 115-e. In some cases, the pathloss reference signal from second UE 115-e may indicate a crosslink interference between first UE 115-d and second UE 115-e. In some cases, the crosslink interference between first UE 115-d and second UE 115-e may be based on uplink communications between first UE 115-d and base station 105-c, or based on downlink communications between second UE 115-e and base station 105-c, or based on both.

At 320, first UE 115-d may receive a pathloss reference signal from third UE 115-f. In some cases, the pathloss reference signal from third UE 115-f may indicate a cross-link interference between first UE 115-d and third UE 115-f In some cases, the crosslink interference between first UE 115-*d* and third UE 115-*f* may be based on uplink communications between first UE 115-*d* and base station 105-*c*, or based on downlink communications between third UE 115-*f* and a second base station apart from base station 105-*c*, or based on both.

At 325, first UE 115-*d* may determine cross-link interference between first UE 115-*d* and second UE 115-*e* based on the pathloss reference signal from second UE 115-*e*. In some cases, first UE 115-*d* may determine that the cross-link interference between first UE 115-*d* and second UE 115-*e* does not satisfy the interference threshold. Additionally, or alternatively, first UE 115-*d* may determine cross-link interference between first UE 115-*d* and third UE 115-*f* based on the pathloss reference signal from third UE 115-*f*. In some cases, first UE 115-*d* may determine that the cross-link interference between first UE 115-*d* and third UE 115-*f* does not satisfy the interference threshold.

At 330, first UE 115-*d* may adjust a transmit power setting of first UE 115-*d* in accordance with the cross-link interference associated with the pathloss reference signal from second UE 115-*e*. In some cases, first UE 115-*d* may adjust the transmit power setting of first UE 115-*d* based on the cross-link interference associated with the pathloss reference signal from second UE 115-*e* failing to satisfy the interference threshold. Additionally, or alternatively, first UE 115-*d* may adjust a transmit power setting of first UE 115-*d* in accordance with the cross-link interference associated with the pathloss reference signal from third UE 115-*f*. In some cases, first UE 115-*d* may adjust the transmit power setting of first UE 115-*d* based on the cross-link interference associated with the pathloss reference signal from third UE 115-*f* failing to satisfy the interference threshold.

In some cases, first UE 115-*d* may reduce the transmit power setting of the first UE relative to a degree to which the cross-link interference (e.g., with second UE 115-*e* or third UE 115-*f*, or both, or an average of the cross-link interference from both) exceeds the interference threshold. In some cases, first UE 115-*d* adjusting the transmit power setting of first UE 115-*d* may include first UE 115-*d* setting an interim maximum transmit power of first UE 115-*d* below an overall maximum transmit power of first UE 115-*d*. In some examples, the overall maximum transmit power of first UE 115-*d* may be 23 decibel-milliwatts (dBm). In some examples, the interference threshold may be set at −20 dBm and the cross-link interference associated with the pathloss reference signal from second UE 115-*e* or third UE 115-*f* may be −10 dBm (e.g., the cross-link interference is 10 dBm over the interference threshold). In some cases, an average of the pathloss reference signal from second UE 115-*e* and the pathloss reference signal from third UE 115-*f* may be −10 dBm. Accordingly, first UE 115-*d* may set an interim maximum transmit power of first UE 115-*d* below an overall maximum transmit power of first UE 115-*d* (e.g., set an interim maximum transmit power at 13 dBm, or 10 dBm below the overall maximum transmit power of 23 dBm based on the cross-link interference being 10 dBm over the interference threshold).

At 335, first UE 115-*d* may compute an uplink metric. In some cases, first UE 115-*d* may compute at least one uplink metric based on the adjusted transmit power setting (e.g., based on the interim maximum transmit power set at 13 dBm). In some cases, first UE 115-*d* may perform a computation to determine the uplink metric. In some cases, the interim maximum transmit power may be an input of the computation of the uplink metric performed by first UE 115-*d* at 335.

At 340, first UE 115-*d* may optionally compute a second uplink metric. In some cases, first UE 115-*d* may compute at least one additional uplink metric based on a default maximum transmit power setting (e.g., based on the overall maximum transmit power set at 23 dBm). In some cases, first UE 115-*d* may perform a computation to determine the second uplink metric. In some cases, the overall maximum transmit power may be an input of the computation of the second uplink metric performed by first UE 115-*d*.

At 345, first UE 115-*d* may transmit an uplink metric report to base station 105-*c*. In some cases, the uplink metric report may include the uplink metric that is computed by first UE 115-*d* at 335 based on the adjusted transmit power setting of first UE 115-*d*. In some cases, the uplink metric report may include the second uplink metric that is optionally computed by first UE 115-*d* at 340 based on the overall transmit power setting of first UE 115-*d*.

At 350, base station 105-*c* may determine whether to continue operating in full duplex based on the uplink metric report. In some cases, base station 105-*c* may analyze the uplink metric report and determine whether the adjusted transmit power setting of first UE 115-*d* (e.g., as indicated the uplink metric computed by first UE 115-*d* at 335) sufficiently mitigates the crosslink interference. When base station 105-*c* determines that the adjusted transmit power setting of first UE 115-*d* sufficiently mitigates the crosslink interference, base station 105-*c* may continue operating in full duplex.

Figure 4:
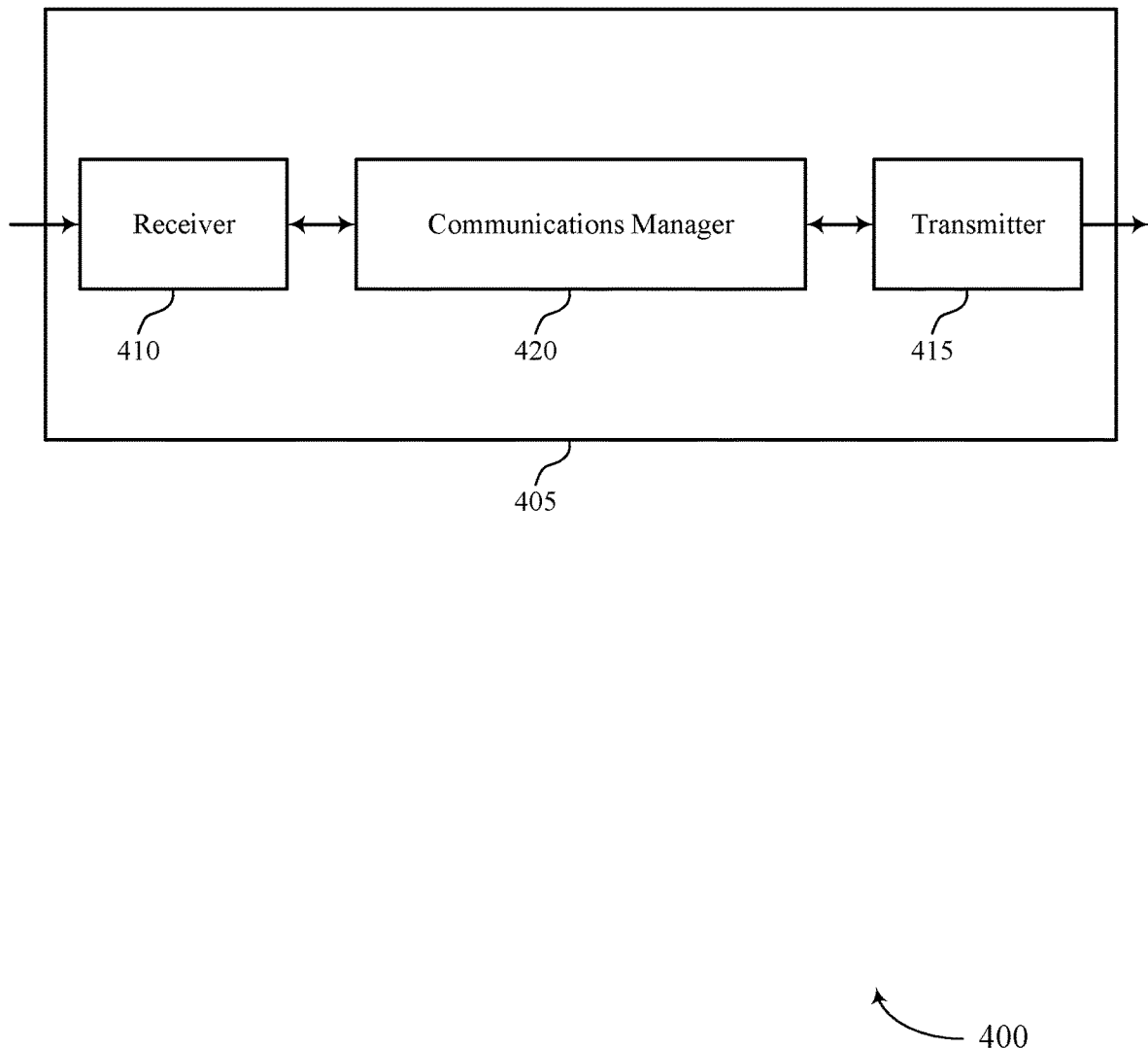
FIGS. 4 and 5 show block diagrams of devices that support uplink metrics based on cross-link interference in accordance with aspects of the present disclosure.

FIG. 4 shows a block diagram 400 of a device 405 that supports uplink metrics based on cross-link interference in accordance with aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to uplink metrics based on cross-link interference). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to uplink metrics based on cross-link interference). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of uplink metrics based on cross-link interference as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communication in accordance with examples as disclosed herein. For example, the communications manager 420 may be configured as or otherwise support a means for receiving at a first UE a pathloss reference signal from a second UE. The communications manager 420 may be configured as or otherwise support a means for determining cross-link interference between the first UE and the second UE based on the pathloss reference signal. The communications manager 420 may be configured as or otherwise support a means for adjusting a transmit power setting of the first UE in accordance with the cross-link interference. The communications manager 420 may be configured as or otherwise support a means for transmitting to a base station an uplink metric report, the uplink metric report including an uplink metric of the first UE that is based on the adjusted transmit power setting of the first UE.

By including or configuring the communications manager 420 in accordance with examples as described herein, the device 405 (e.g., a processor controlling or otherwise coupled to the receiver 410, the transmitter 415, the communications manager 420, or a combination thereof) may support techniques for improvements in system efficiency such that latency associated with the uplink UE or downlink UE, or both, is reduced (e.g., receive downlink signals in uplink-only slots, resulting in latency savings). Additionally, described techniques may result in reduced processing, reduced power consumption, more efficient utilization of communication resources.

Figure 5:
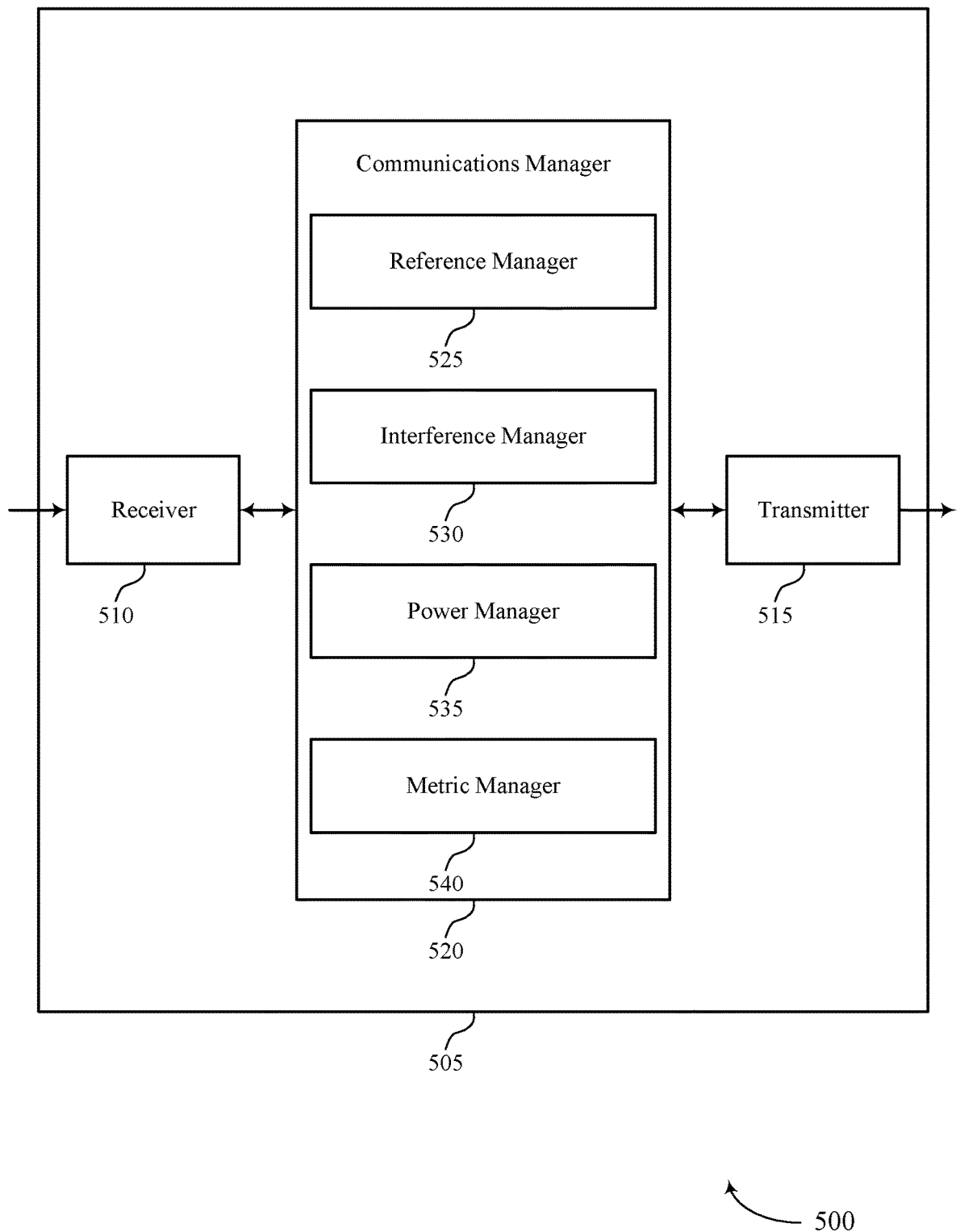

FIG. 5 shows a block diagram 500 of a device 505 that supports uplink metrics based on cross-link interference in accordance with aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to uplink metrics based on cross-link interference). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to uplink metrics based on cross-link interference). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of uplink metrics based on cross-link interference as described herein. For example, the communications manager 520 may include a reference manager 525, an interference manager 530, a power manager 535, a metric manager 540, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication in accordance with examples as disclosed herein. The reference manager 525 may be configured as or otherwise support a means for receiving at a first UE a pathloss reference signal from a second UE. The interference manager 530 may be configured as or otherwise support a means for determining cross-link interference between the first UE and the second UE based on the pathloss reference signal. The power manager 535 may be configured as or otherwise support a means for adjusting a transmit power setting of the first UE in accordance with the cross-link interference. The metric manager 540 may be configured as or otherwise support a means for transmitting to a base station an uplink metric report, the uplink metric report including an uplink metric of the first UE that is based on the adjusted transmit power setting of the first UE.

Figure 6:
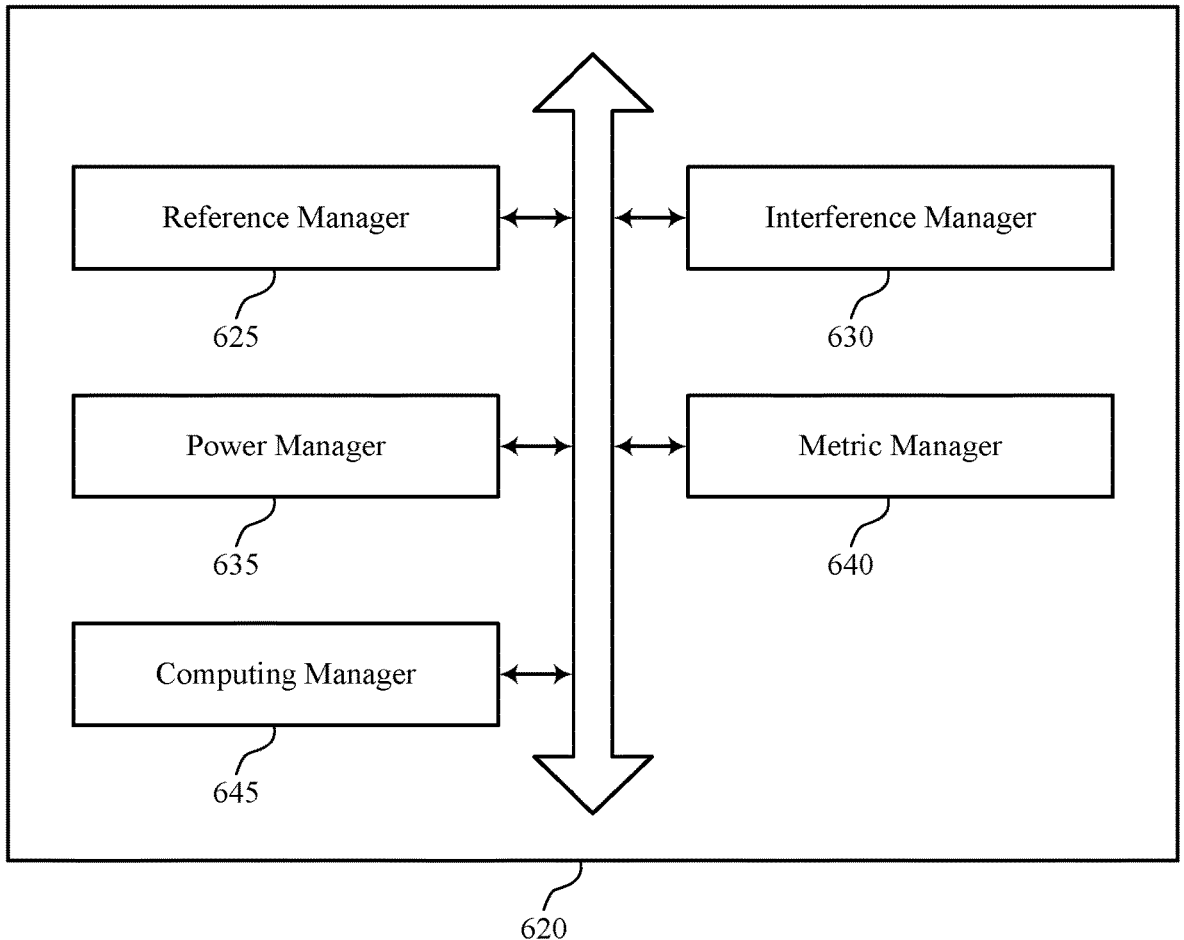
FIG. 6 shows a block diagram of a communications manager that supports uplink metrics based on cross-link interference in accordance with aspects of the present disclosure.

FIG. 6 shows a block diagram 600 of a communications manager 620 that supports uplink metrics based on cross-link interference in accordance with aspects of the present disclosure. The communications manager 620 may be an example of aspects of a communications manager 420, a communications manager 520, or both, as described herein. The communications manager 620, or various components thereof, may be an example of means for performing various aspects of uplink metrics based on cross-link interference as described herein. For example, the communications manager 620 may include a reference manager 625, an interference manager 630, a power manager 635, a metric manager 640, a computing manager 645, or any combination thereof. Each of these components may communicate, directly or indirectly, with one another (e.g., via one or more buses).

The communications manager 620 may support wireless communication in accordance with examples as disclosed herein. The reference manager 625 may be configured as or otherwise support a means for receiving at a first UE a pathloss reference signal from a second UE. The interference manager 630 may be configured as or otherwise support a means for determining cross-link interference between the first UE and the second UE based on the pathloss reference signal. The power manager 635 may be configured as or otherwise support a means for adjusting a transmit power setting of the first UE in accordance with the cross-link interference. The metric manager 640 may be configured as or otherwise support a means for transmitting to a base station an uplink metric report, the uplink metric report including an uplink metric of the first UE that is based on the adjusted transmit power setting of the first UE.

In some examples, the interference manager 630 may be configured as or otherwise support a means for receiving an interference threshold from the base station. In some examples, the interference manager 630 may be configured as or otherwise support a means for determining that the cross-link interference does not satisfy the interference threshold.

In some examples, the interference manager 630 may be configured as or otherwise support a means for adjusting the transmit power setting based on the determining that the cross-link interference does not satisfy the interference threshold. In some examples, to support adjusting the transmit power setting, the interference manager 630 may be configured as or otherwise support a means for reducing the transmit power setting of the first UE relative to a degree to which the cross-link interference exceeds the interference threshold.

In some examples, the computing manager 645 may be configured as or otherwise support a means for calculating the uplink metric, where an input of the calculating of the uplink metric includes the adjusted transmit power setting of the first UE. In some examples, the uplink metric includes a first power headroom of the first UE, a first reference signal received power of the first UE, or a first power management maximum power reduction of the first UE, or any combination thereof.

In some examples, the computing manager 645 may be configured as or otherwise support a means for calculating a second uplink metric, where an input of the calculating of the second uplink metric includes a maximum transmit power of the first UE. In some examples, the uplink metric report includes the uplink metric and the second uplink metric. In some examples, the second uplink metric includes a second power headroom of the first UE, a second reference signal received power of the first UE, or a second power management maximum power reduction of the first UE, or any combination thereof.

In some examples, to support adjusting the transmit power setting, the power manager 635 may be configured as or otherwise support a means for reducing the transmit power setting of the first UE below a maximum uplink transmit power of the first UE. In some examples, the first UE is an aggressor UE and the second UE is a victim UE. In some examples, the cross-link interference corresponds to full duplex communications at the base station.

Figure 7:
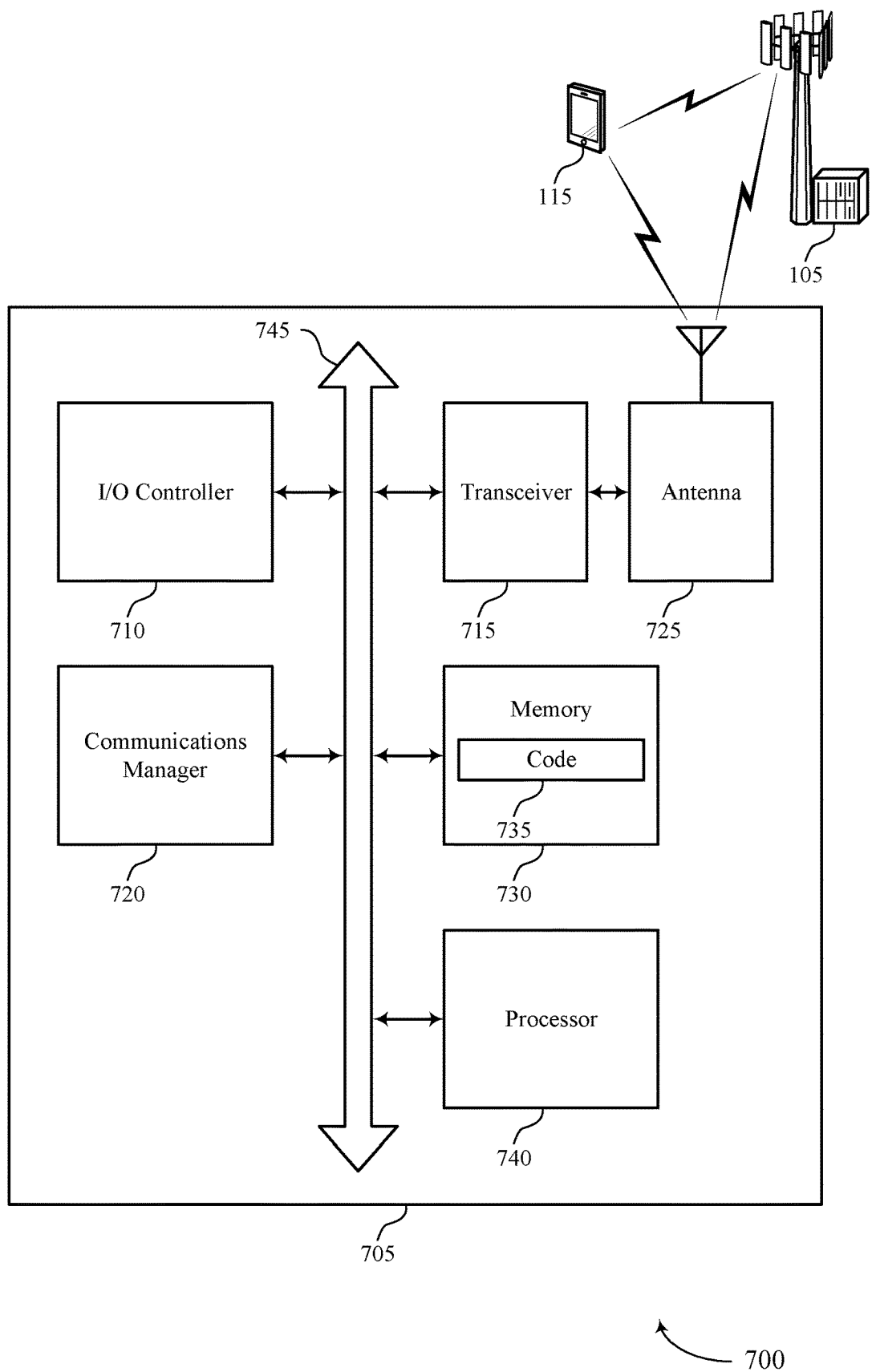
FIG. 7 shows a diagram of a system including a device that supports uplink metrics based on cross-link interference in accordance with aspects of the present disclosure.

FIG. 7 shows a diagram of a system 700 including a device 705 that supports uplink metrics based on cross-link interference in accordance with aspects of the present disclosure. The device 705 may be an example of or include the components of a device 405, a device 505, or a UE 115 as described herein. The device 705 may communicate wirelessly with one or more base stations 105, UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting uplink metrics based on cross-link interference). For example, the device 705 or a component of the device 705 may include a processor 740 and memory 730 coupled to the processor 740, the processor 740 and memory 730 configured to perform various functions described herein.

The communications manager 720 may support wireless communication in accordance with examples as disclosed herein. For example, the communications manager 720 may be configured as or otherwise support a means for receiving at a first UE a pathloss reference signal from a second UE. The communications manager 720 may be configured as or otherwise support a means for determining cross-link interference between the first UE and the second UE based on the pathloss reference signal. The communications manager 720 may be configured as or otherwise support a means for adjusting a transmit power setting of the first UE in accordance with the cross-link interference. The communications manager 720 may be configured as or otherwise support a means for transmitting to a base station an uplink metric report, the uplink metric report including an uplink metric of the first UE that is based on the adjusted transmit power setting of the first UE.

By including or configuring the communications manager 720 in accordance with examples as described herein, the device 705 may support techniques for improvements in system efficiency such that latency associated with the uplink UE or downlink UE, or both, is reduced (e.g., receive downlink signals in uplink-only slots, resulting in latency savings). Additionally, described techniques may result in improved communication reliability, reduced latency, improved user experience related to reduced processing, reduced power consumption, more efficient utilization of communication resources, improved coordination between devices, longer battery life, improved utilization of processing capability.

In some examples, the communications manager 720 may be configured to perform various operations (e.g., receiving, monitoring, transmitting) using or otherwise in cooperation with the transceiver 715, the one or more antennas 725, or any combination thereof. For example, the communications manager 720 may be configured to receive or transmit messages or other signaling as described herein via the transceiver 715. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of uplink metrics based on cross-link interference as described herein, or the processor 740 and the memory 730 may be otherwise configured to perform or support such operations.

Figure 8:
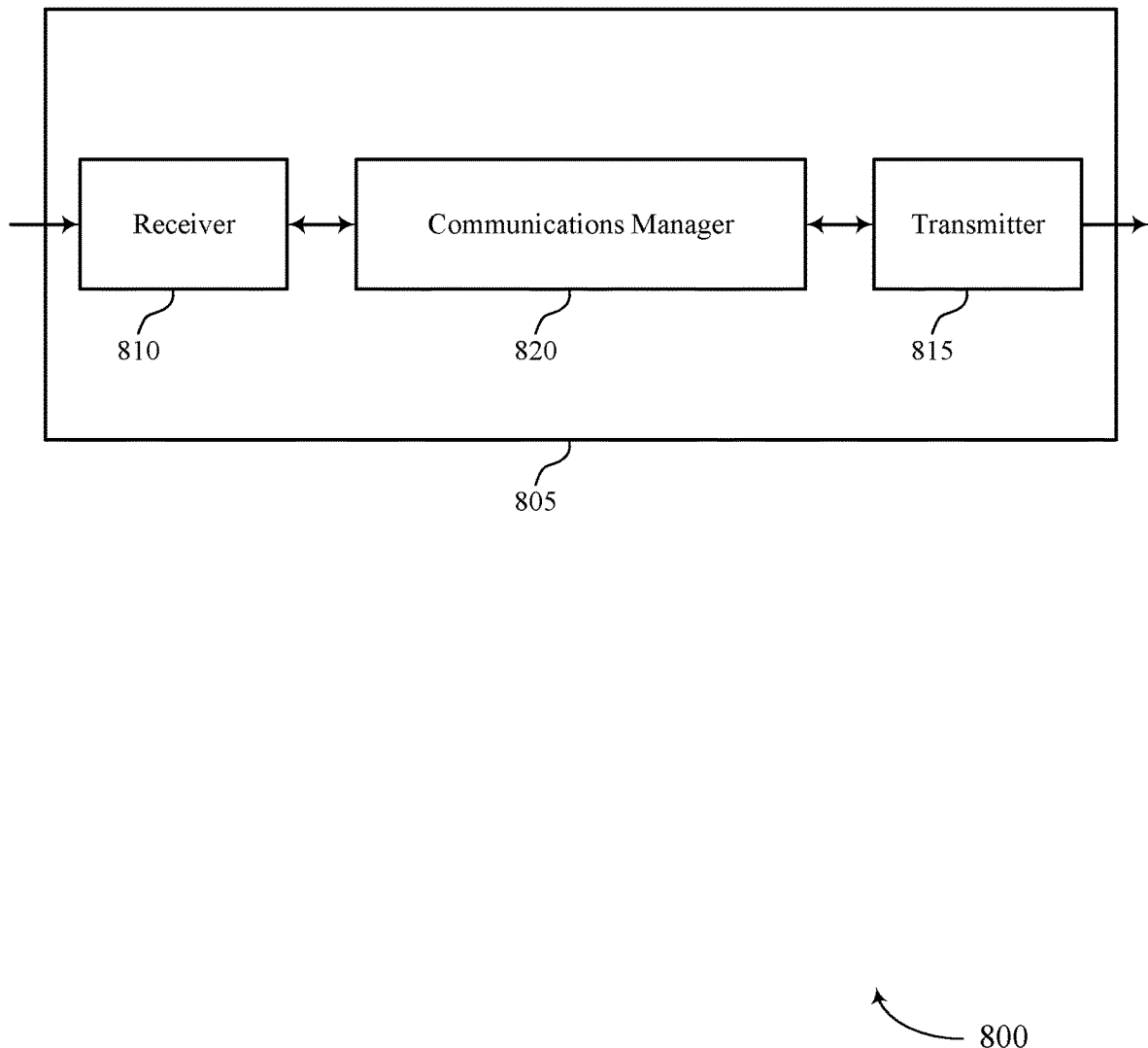
FIGS. 8 and 9 show block diagrams of devices that support uplink metrics based on cross-link interference in accordance with aspects of the present disclosure.

FIG. 8 shows a block diagram 800 of a device 805 that supports uplink metrics based on cross-link interference in accordance with aspects of the present disclosure. The device 805 may be an example of aspects of a base station 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to uplink metrics based on cross-link interference). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to uplink metrics based on cross-link interference). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of uplink metrics based on cross-link interference as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a base station in accordance with examples as disclosed herein. For example, the communications manager 820 may be configured as or otherwise support a means for establishing full-duplex communications with a first UE and a second UE. The communications manager 820 may be configured as or otherwise support a means for transmitting an interference threshold to the first UE. The communications manager 820 may be configured as or otherwise support a means for receiving an uplink metric report from the first UE, the uplink metric report including an uplink metric of the first UE that is based on an adjusted transmit power setting of the first UE in relation to cross-link interference at the first UE failing to satisfy the interference threshold.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for improvements in system efficiency such that latency associated with the uplink UE or downlink UE, or both, is reduced (e.g., receive downlink signals in uplink-only slots, resulting in latency savings). Additionally, described techniques may result in reduced processing, reduced power consumption, more efficient utilization of communication resources.

Figure 9:
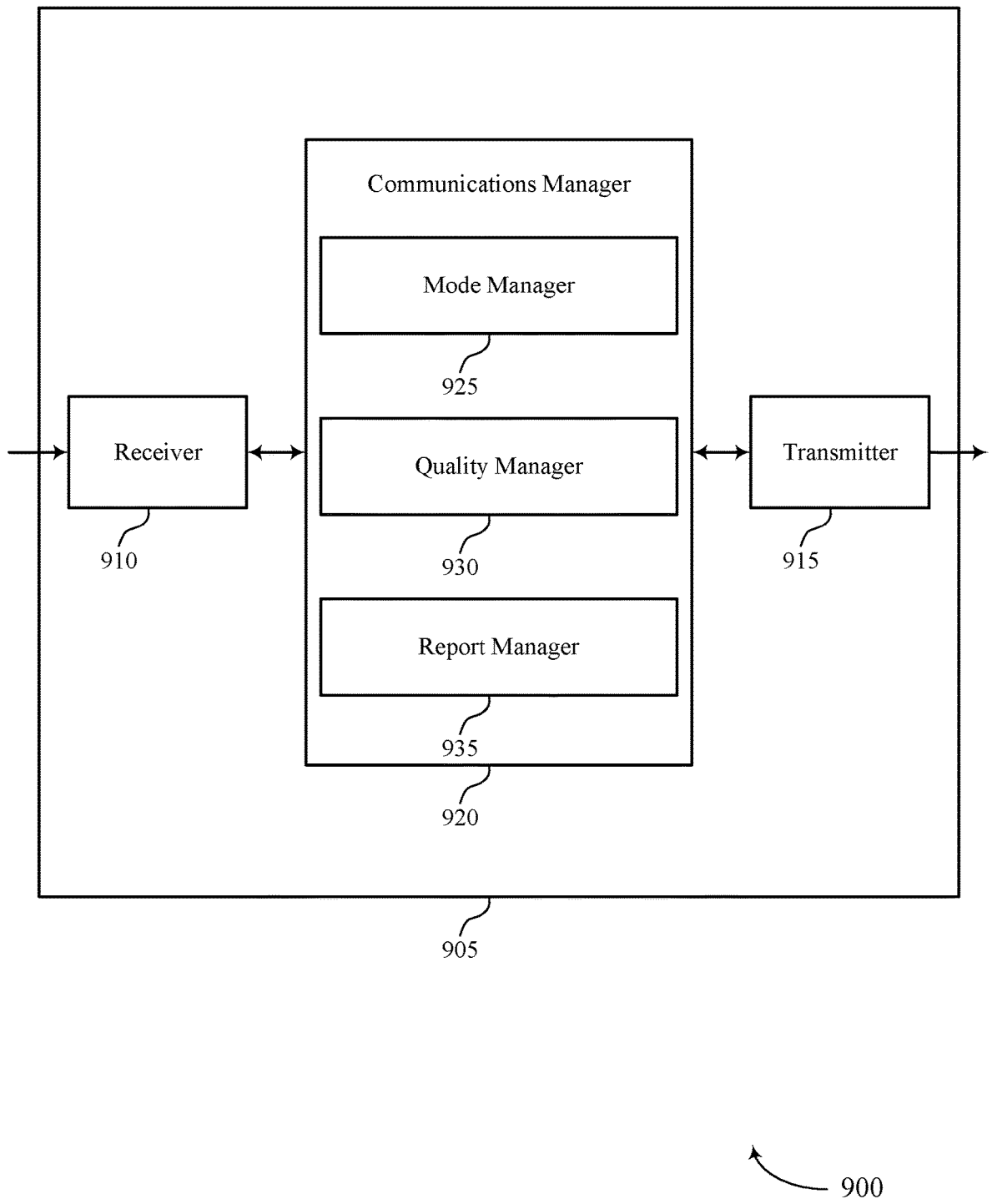

FIG. 9 shows a block diagram 900 of a device 905 that supports uplink metrics based on cross-link interference in accordance with aspects of the present disclosure. The device 905 may be an example of aspects of a device 805 or a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to uplink metrics based on cross-link interference). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to uplink metrics based on cross-link interference). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of uplink metrics based on cross-link interference as described herein. For example, the communications manager 920 may include a mode manager 925, a quality manager 930, a report manager 935, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a base station in accordance with examples as disclosed herein. The mode manager 925 may be configured as or otherwise support a means for establishing full-duplex communications with a first UE and a second UE. The quality manager 930 may be configured as or otherwise support a means for transmitting an interference threshold to the first UE. The report manager 935 may be configured as or otherwise support a means for receiving an uplink metric report from the first UE, the uplink metric report including an uplink metric of the first UE that is based on an adjusted transmit power setting of the first UE in relation to cross-link interference at the first UE failing to satisfy the interference threshold.

Figure 10:
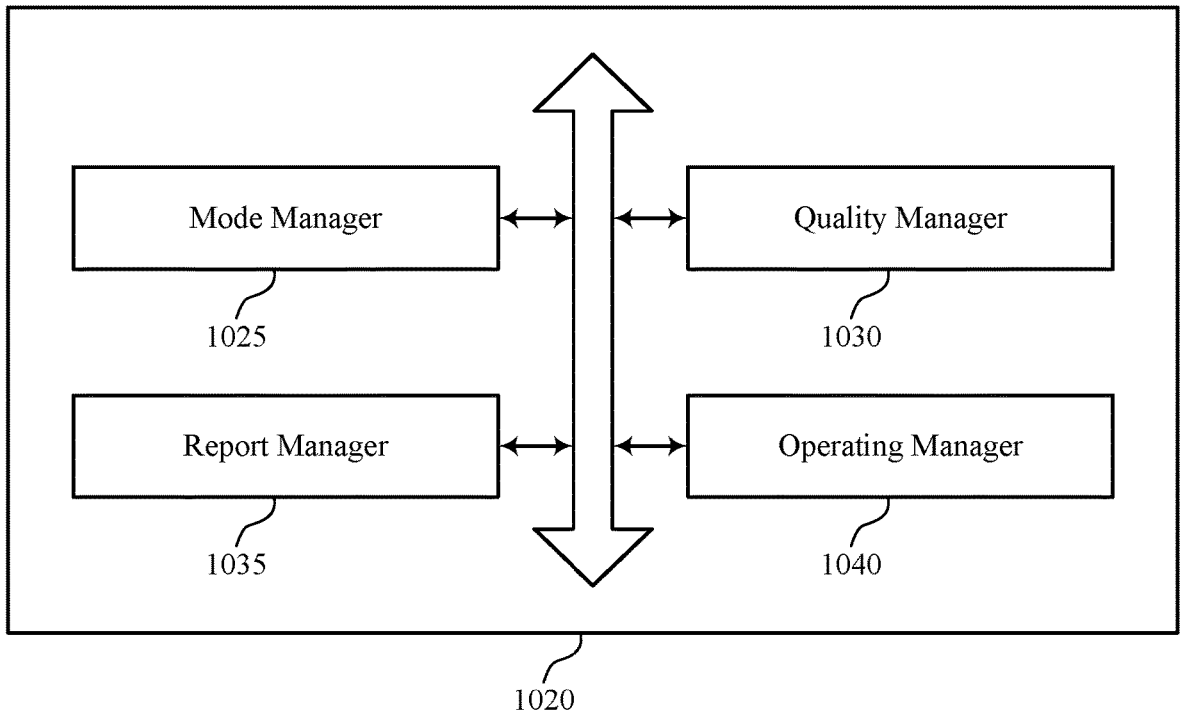
FIG. 10 shows a block diagram of a communications manager that supports uplink metrics based on cross-link interference in accordance with aspects of the present disclosure.

FIG. 10 shows a block diagram 1000 of a communications manager 1020 that supports uplink metrics based on cross-link interference in accordance with aspects of the present disclosure. The communications manager 1020 may be an example of aspects of a communications manager 820, a communications manager 920, or both, as described herein. The communications manager 1020, or various components thereof, may be an example of means for performing various aspects of uplink metrics based on cross-link interference as described herein. For example, the communications manager 1020 may include a mode manager 1025, a quality manager 1030, a report manager 1035, an operating manager 1040, or any combination thereof. Each of these components may communicate, directly or indirectly, with one another (e.g., via one or more buses).

The communications manager 1020 may support wireless communication at a base station in accordance with examples as disclosed herein. The mode manager 1025 may be configured as or otherwise support a means for establishing full-duplex communications with a first UE and a second UE. The quality manager 1030 may be configured as or otherwise support a means for transmitting an interference threshold to the first UE. The report manager 1035 may be configured as or otherwise support a means for receiving an uplink metric report from the first UE, the uplink metric report including an uplink metric of the first UE that is based on an adjusted transmit power setting of the first UE in relation to cross-link interference at the first UE failing to satisfy the interference threshold.

In some examples, the operating manager 1040 may be configured as or otherwise support a means for determining whether to continue operating in full duplex based on the uplink metric report.

In some examples, the uplink metric includes a first power headroom of the first UE, a first reference signal received power of the first UE, or a first power management maximum power reduction of the first UE, or any combination thereof.

In some examples, the uplink metric report includes the uplink metric and a second uplink metric that is based on a maximum transmit power of the first UE independent of the cross-link interference at the first UE.

In some examples, the second uplink metric includes a second power headroom of the first UE, a second reference signal received power of the first UE, or a second power management maximum power reduction of the first UE, or any combination thereof.

Figure 11:
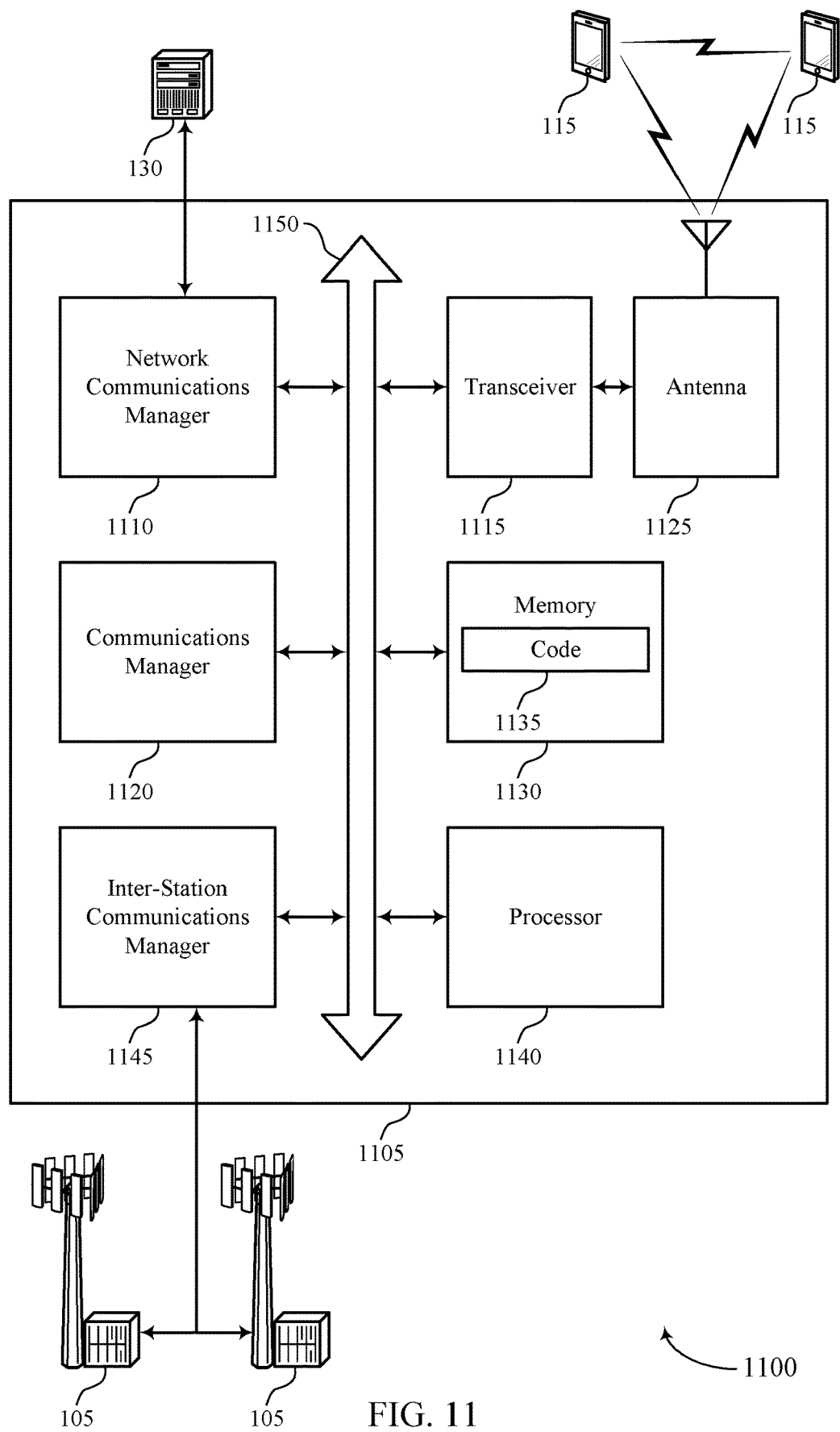
FIG. 11 shows a diagram of a system including a device that supports uplink metrics based on cross-link interference in accordance with aspects of the present disclosure.

FIG. 11 shows a diagram of a system 1100 including a device 1105 that supports uplink metrics based on cross-link interference in accordance with aspects of the present disclosure. The device 1105 may be an example of or include the components of a device 805, a device 905, or a base station 105 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, a network communications manager 1110, a transceiver 1115, an antenna 1125, a memory 1130, code 1135, a processor 1140, and an inter-station communications manager 1145. These components may be in electronic communication or otherwise coupled (e.g., operatively, communicatively, functionally, electronically, electrically) via one or more buses (e.g., a bus 1150).

The network communications manager 1110 may manage communications with a core network 130 (e.g., via one or more wired backhaul links). For example, the network communications manager 1110 may manage the transfer of data communications for client devices, such as one or more UEs 115.

In some cases, the device 1105 may include a single antenna 1125. However, in some other cases the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include RAM and ROM. The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a BIOS which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting uplink metrics based on cross-link interference). For example, the device 1105 or a component of the device 1105 may include a processor 1140 and memory 1130 coupled to the processor 1140, the processor 1140 and memory 1130 configured to perform various functions described herein.

The inter-station communications manager 1145 may manage communications with other base stations 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communications network technology to provide communication between base stations 105.

The communications manager 1120 may support wireless communication at a base station in accordance with examples as disclosed herein. For example, the communications manager 1120 may be configured as or otherwise support a means for establishing full-duplex communications with a first UE and a second UE. The communications manager 1120 may be configured as or otherwise support a means for transmitting an interference threshold to the first UE. The communications manager 1120 may be configured as or otherwise support a means for receiving an uplink metric report from the first UE, the uplink metric report including an uplink metric of the first UE that is based on an adjusted transmit power setting of the first UE in relation to cross-link interference at the first UE failing to satisfy the interference threshold.

By including or configuring the communications manager 1120 in accordance with examples as described herein, the device 1105 may support techniques for improvements in system efficiency such that latency associated with the uplink UE or downlink UE, or both, is reduced (e.g., receive downlink signals in uplink-only slots, resulting in latency savings). Additionally, described techniques may result in improved communication reliability, reduced latency, improved user experience related to reduced processing, reduced power consumption, more efficient utilization of communication resources, improved coordination between devices, longer battery life, improved utilization of processing capability.

In some examples, the communications manager 1120 may be configured to perform various operations (e.g., receiving, monitoring, transmitting) using or otherwise in cooperation with the transceiver 1115, the one or more antennas 1125, or any combination thereof. For example, the communications manager 1120 may be configured to receive or transmit messages or other signaling as described herein via the transceiver 1115. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of uplink metrics based on cross-link interference as described herein, or the processor 1140 and the memory 1130 may be otherwise configured to perform or support such operations.

Figure 12:
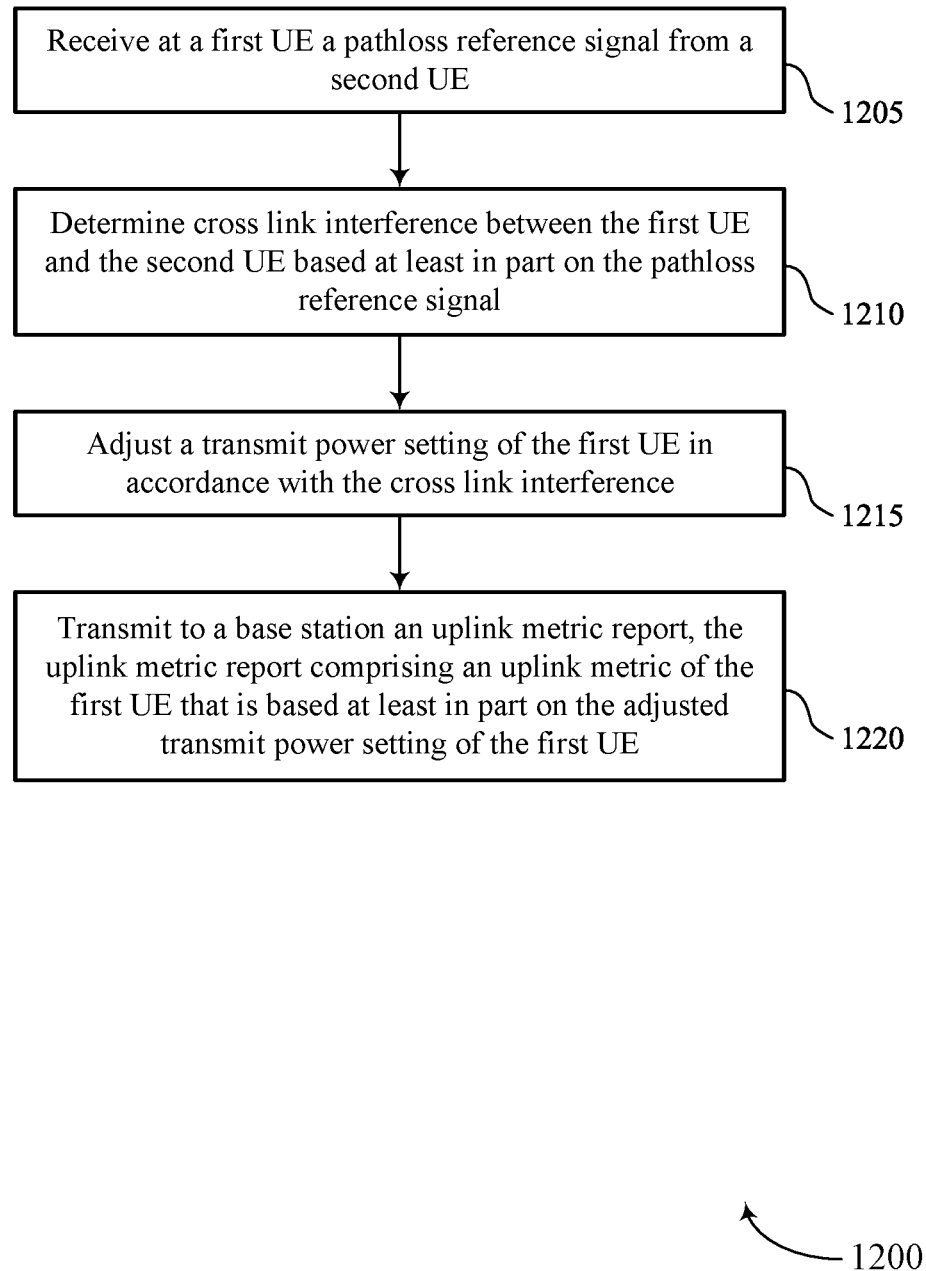
FIGS. 12 and 13 show flowcharts illustrating methods that support uplink metrics based on cross-link interference in accordance with aspects of the present disclosure.

FIG. 12 shows a flowchart illustrating a method 1200 that supports uplink metrics based on cross-link interference in accordance with aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1205, the method may include receiving at a first UE a pathloss reference signal from a second UE. The operations of 1205 may be performed in accordance with examples as disclosed herein. In some examples, aspects of the operations of 1205 may be performed by a reference manager 625 as described with reference to FIG. 6. Additionally, or alternatively, means for performing 1205 may, but not necessarily, include, for example, antenna 725, transceiver 715, communications manager 720, memory 730 (including code 735), processor 740 and/or bus 745.

At 1210, the method may include determining cross-link interference between the first UE and the second UE based on the pathloss reference signal. The operations of 1210 may be performed in accordance with examples as disclosed herein. In some examples, aspects of the operations of 1210 may be performed by an interference manager 630 as described with reference to FIG. 6. Additionally, or alternatively, means for performing 1210 may, but not necessarily, include, for example, antenna 725, transceiver 715, communications manager 720, memory 730 (including code 735), processor 740 and/or bus 745.

At 1215, the method may include adjusting a transmit power setting of the first UE in accordance with the cross-link interference. The operations of 1215 may be performed in accordance with examples as disclosed herein. In some examples, aspects of the operations of 1215 may be performed by a power manager 635 as described with reference to FIG. 6. Additionally, or alternatively, means for performing 1215 may, but not necessarily, include, for example, antenna 725, transceiver 715, communications manager 720, memory 730 (including code 735), processor 740 and/or bus 745.

At 1220, the method may include transmitting to a base station an uplink metric report, the uplink metric report including an uplink metric of the first UE that is based on the adjusted transmit power setting of the first UE. The operations of 1220 may be performed in accordance with examples as disclosed herein. In some examples, aspects of the operations of 1220 may be performed by a metric manager 640 as described with reference to FIG. 6. Additionally, or alternatively, means for performing 1220 may, but not necessarily, include, for example, antenna 725, transceiver 715, communications manager 720, memory 730 (including code 735), processor 740 and/or bus 745.

Figure 13:
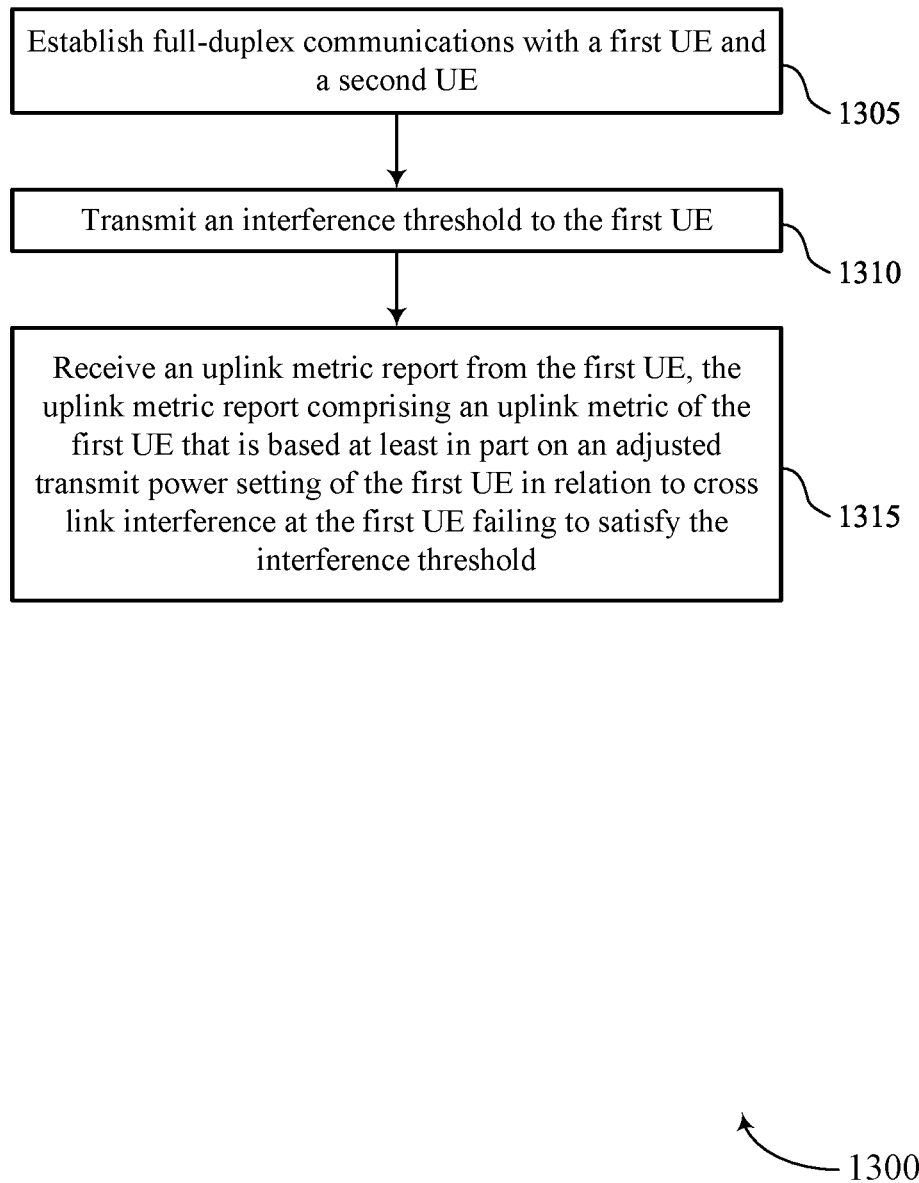

FIG. 13 shows a flowchart illustrating a method 1300 that supports uplink metrics based on cross-link interference in accordance with aspects of the present disclosure. The operations of the method 1300 may be implemented by a base station or its components as described herein. For example, the operations of the method 1300 may be performed by a base station 105 as described with reference to FIGS. 1 through 3 and 8 through 11. In some examples, a base station may execute a set of instructions to control the functional elements of the base station to perform the described functions. Additionally or alternatively, the base station may perform aspects of the described functions using special-purpose hardware.

At 1305, the method may include establishing full-duplex communications with a first UE and a second UE. The operations of 1305 may be performed in accordance with examples as disclosed herein. In some examples, aspects of the operations of 1305 may be performed by a mode manager 1025 as described with reference to FIG. 10. Additionally, or alternatively, means for performing 1305 may, but not necessarily, include, for example, antenna 1125, network communications manager 1110, transceiver 1115, communications manager 1120, memory 1130 (including code 1135), processor 1140, inter-station communications manager 1145, and/or bus 1150.

At 1310, the method may include transmitting an interference threshold to the first UE. The operations of 1310 may be performed in accordance with examples as disclosed herein. In some examples, aspects of the operations of 1310 may be performed by a quality manager 1030 as described with reference to FIG. 10. Additionally, or alternatively, means for performing 1310 may, but not necessarily, include, for example, antenna 1125, network communications manager 1110, transceiver 1115, communications manager 1120, memory 1130 (including code 1135), processor 1140, inter-station communications manager 1145, and/or bus 1150.

At 1315, the method may include receiving an uplink metric report from the first UE, the uplink metric report including an uplink metric of the first UE that is based on an adjusted transmit power setting of the first UE in relation to cross-link interference at the first UE failing to satisfy the interference threshold. The operations of 1315 may be performed in accordance with examples as disclosed herein. In some examples, aspects of the operations of 1315 may be performed by a report manager 1035 as described with reference to FIG. 10. Additionally, or alternatively, means for performing 1315 may, but not necessarily, include, for example, antenna 1125, network communications manager 1110, transceiver 1115, communications manager 1120, memory 1130 (including code 1135), processor 1140, inter-station communications manager 1145, and/or bus 1150.

The following provides an overview of aspects of the present disclosure:

Aspect 1: A method for wireless communication, comprising: receiving at a first UE a pathloss reference signal from a second UE; determining cross-link interference between the first UE and the second UE based at least in part on the pathloss reference signal; adjusting a transmit power setting of the first UE in accordance with the cross-link interference; and transmitting to a base station an uplink metric report, the uplink metric report comprising an uplink metric of the first UE that is based at least in part on the adjusted transmit power setting of the first UE.

Aspect 2: The method of aspect 1, further comprising: receiving an interference threshold from the base station; and determining that the cross-link interference does not satisfy the interference threshold.

Aspect 3: The method of aspect 2, further comprising: adjusting the transmit power setting based at least in part on the determining that the cross-link interference does not satisfy the interference threshold.

Aspect 4: The method of any of aspects 2 through 3, wherein adjusting the transmit power setting comprises: reducing the transmit power setting of the first UE relative to a degree to which the cross-link interference exceeds the interference threshold.

Aspect 5: The method of any of aspects 1 through 4, further comprising: calculating the uplink metric, wherein an input of the calculating of the uplink metric comprises the adjusted transmit power setting of the first UE.

Aspect 6: The method of aspect 5, wherein the uplink metric comprises a first power headroom of the first UE, a first reference signal received power of the first UE, or a first power management maximum power reduction of the first UE, or any combination thereof.

Aspect 7: The method of any of aspects 1 through 6, further comprising: calculating a second uplink metric, wherein an input of the calculating of the second uplink metric comprises a maximum transmit power of the first UE.

Aspect 8: The method of aspect 7, wherein the uplink metric report comprises the uplink metric and the second uplink metric.

Aspect 9: The method of any of aspects 7 through 8, wherein the second uplink metric comprises a second power headroom of the first UE, a second reference signal received power of the first UE, or a second power management maximum power reduction of the first UE, or any combination thereof.

Aspect 10: The method of any of aspects 1 through 9, wherein adjusting the transmit power setting comprises: reducing the transmit power setting of the first UE below a maximum uplink transmit power of the first UE.

Aspect 11: The method of any of aspects 1 through 10, wherein the first UE is an aggressor UE and the second UE is a victim UE.

Aspect 12: The method of any of aspects 1 through 11, wherein the cross-link interference corresponds to full duplex communications at the base station.

Aspect 13: A method for wireless communication at a base station, comprising: establishing full-duplex communications with a first UE and a second UE; transmitting an interference threshold to the first UE; and receiving an uplink metric report from the first UE, the uplink metric report comprising an uplink metric of the first UE that is based at least in part on an adjusted transmit power setting of the first UE in relation to cross-link interference at the first UE failing to satisfy the interference threshold.

Aspect 14: The method of aspect 13, further comprising: determining whether to continue operating in full duplex based at least in part on the uplink metric report.

Aspect 15: The method of any of aspects 13 through 14, wherein the uplink metric comprises a first power headroom of the first UE, a first reference signal received power of the first UE, or a first power management maximum power reduction of the first UE, or any combination thereof.

Aspect 16: The method of any of aspects 13 through 15, wherein the uplink metric report comprises the uplink metric and a second uplink metric that is based at least in part on a maximum transmit power of the first UE independent of the cross-link interference at the first UE.

Aspect 17: The method of aspect 16, wherein the second uplink metric comprises a second power headroom of the first UE, a second reference signal received power of the first UE, or a second power management maximum power reduction of the first UE, or any combination thereof.

Aspect 18: An apparatus comprising a memory, transceiver, and at least one processor coupled with the memory and the transceiver, the at least one processor configured to cause the apparatus to perform a method of any of aspects 1 through 12.

Aspect 19: An apparatus for wireless communication, comprising at least one means for performing a method of any of aspects 1 through 12.

Aspect 20: A non-transitory computer-readable medium storing code for wireless communication, the code comprising instructions executable by a processor to perform a method of any of aspects 1 through 12.

Aspect 21: An apparatus comprising a memory, transceiver, and at least one processor coupled with the memory and the transceiver, the at least one processor configured to cause the apparatus to perform a method of any of aspects 13 through 17.

Aspect 22: An apparatus for wireless communication at a base station, comprising at least one means for performing a method of any of aspects 13 through 17.

Aspect 23: A non-transitory computer-readable medium storing code for wireless communication at a base station, the code comprising instructions executable by a processor to perform a method of any of aspects 13 through 17.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication, comprising:
   a memory;
   a transceiver; and
   at least one processor of a first user equipment (UE), the at least one processor coupled with the memory and the transceiver, and the at least one processor configured to cause the apparatus to:
      receive at the first UE a pathloss reference signal from a second UE;
      determine cross-link interference between the first UE and the second UE based at least in part on the pathloss reference signal;
      adjust a transmit power setting of the first UE in accordance with the cross-link interference; and
      transmit to a network device an uplink metric report, the uplink metric report comprising an uplink metric of the first UE that is based at least in part on the adjusted transmit power setting of the first UE.

2. The apparatus of claim 1, the at least one processor further configured to cause the apparatus to:
   receive an interference threshold from the network device; and
   determine that the cross-link interference does not satisfy the interference threshold.

3. The apparatus of claim 2, the at least one processor further configured to cause the apparatus to:
   adjust the transmit power setting based at least in part on the determining that the cross-link interference does not satisfy the interference threshold.

4. The apparatus of claim 2, the at least one processor further configured to cause the apparatus to:
   reduce the transmit power setting of the first UE relative to a degree to which the cross-link interference exceeds the interference threshold.

5. The apparatus of claim 1, the at least one processor further configured to cause the apparatus to:

calculate the uplink metric, wherein an input of the calculating of the uplink metric comprises the adjusted transmit power setting of the first UE.

6. The apparatus of claim 5, wherein the uplink metric comprises a first power headroom of the first UE, a first reference signal received power of the first UE, or a first power management maximum power reduction of the first UE, or any combination thereof.

7. The apparatus of claim 1, the at least one processor further configured to cause the apparatus to:
calculate a second uplink metric, wherein an input of the calculating of the second uplink metric comprises a maximum transmit power of the first UE.

8. The apparatus of claim 7, wherein the uplink metric report comprises the uplink metric and the second uplink metric.

9. The apparatus of claim 7, wherein the second uplink metric comprises a second power headroom of the first UE, a second reference signal received power of the first UE, or a second power management maximum power reduction of the first UE, or any combination thereof.

10. The apparatus of claim 1, the at least one processor further configured to cause the apparatus to:
reduce the transmit power setting of the first UE below a maximum uplink transmit power of the first UE.

11. The apparatus of claim 1, wherein the first UE is an aggressor UE and the second UE is a victim UE.

12. The apparatus of claim 1, wherein the cross-link interference corresponds to full duplex communications at the network device.

13. A method for wireless communication, comprising:
receiving at a first user equipment (UE) a pathloss reference signal from a second UE;
determining cross-link interference between the first UE and the second UE based at least in part on the pathloss reference signal;
adjusting a transmit power setting of the first UE in accordance with the cross-link interference; and
transmitting to a network device an uplink metric report, the uplink metric report comprising an uplink metric of the first UE that is based at least in part on the adjusted transmit power setting of the first UE.

14. The method of claim 13, further comprising:
receiving an interference threshold from the network device; and
determining that the cross-link interference does not satisfy the interference threshold.

15. The method of claim 14, further comprising:
adjusting the transmit power setting based at least in part on the determining that the cross-link interference does not satisfy the interference threshold.

16. The method of claim 14, wherein adjusting the transmit power setting comprises:
reducing the transmit power setting of the first UE relative to a degree to which the cross-link interference exceeds the interference threshold.

17. The method of claim 13, further comprising:
calculating the uplink metric, wherein an input of the calculating of the uplink metric comprises the adjusted transmit power setting of the first UE.

18. The method of claim 17, wherein the uplink metric comprises a first power headroom of the first UE, a first reference signal received power of the first UE, or a first power management maximum power reduction of the first UE, or any combination thereof.

19. The method of claim 13, further comprising:
calculating a second uplink metric, wherein an input of the calculating of the second uplink metric comprises a maximum transmit power of the first UE.

20. The method of claim 19, wherein the uplink metric report comprises the uplink metric and the second uplink metric.

21. The method of claim 19, wherein the second uplink metric comprises a second power headroom of the first UE, a second reference signal received power of the first UE, or a second power management maximum power reduction of the first UE, or any combination thereof.

22. The method of claim 13, wherein adjusting the transmit power setting comprises:
reducing the transmit power setting of the first UE below a maximum uplink transmit power of the first UE.

23. The method of claim 13, wherein the first UE is an aggressor UE and the second UE is a victim UE.

24. The method of claim 13, wherein the cross-link interference corresponds to full duplex communications at the network device.

* * * * *